United States Patent [19]
Yokoyama

[11] Patent Number: 5,868,660
[45] Date of Patent: Feb. 9, 1999

[54] METHOD AND APPARATUS FOR FOLDING UP AIR BAG

[75] Inventor: Hirohisa Yokoyama, Aichi, Japan

[73] Assignee: Toyoda Gosei Co., Ltd., Aichi-ken, Japan

[21] Appl. No.: 573,246

[22] Filed: Dec. 15, 1995

[30] Foreign Application Priority Data

Dec. 20, 1994 [JP] Japan .................................. 6-317218

[51] Int. Cl.$^6$ .................................................. B60R 21/16
[52] U.S. Cl. ........................ 493/405; 493/451; 493/458; 493/940
[58] Field of Search ................................. 493/243, 244, 493/245, 266, 267, 314, 405, 406, 450, 451, 457, 458, 940; 53/429, 116, 117; 280/728.1, 743.1

[56] References Cited

U.S. PATENT DOCUMENTS

| | | | |
|---|---|---|---|
| Re. 35,265 | 6/1996 | Baker et al. | 493/405 |
| 5,022,675 | 6/1991 | Zelenak, Jr. et al. | 280/743 |
| 5,162,035 | 11/1992 | Baker | 493/405 |
| 5,163,893 | 11/1992 | Hara et al. | 493/451 |
| 5,275,435 | 1/1994 | Fischer | 280/743 |
| 5,300,011 | 4/1994 | Budde et al. | 493/405 |
| 5,360,387 | 11/1994 | Baker | 493/405 |
| 5,375,393 | 12/1994 | Baker et al. | 53/429 |
| 5,391,137 | 2/1995 | DePoy et al. | 493/405 |
| 5,456,651 | 10/1995 | Baker et al. | 493/405 |
| 5,471,817 | 12/1995 | Baker et al. | 53/429 |
| 5,493,846 | 2/1996 | Baker et al. | 53/429 |
| 5,575,748 | 11/1996 | Budde et al. | 493/477 |
| 5,605,350 | 2/1997 | Bates et al. | 280/743.1 |
| 5,669,204 | 9/1997 | Blaisdell | 53/429 |
| 5,746,690 | 5/1998 | Humbarger et al. | 493/405 |
| 5,755,078 | 5/1998 | Hurtig, Jr. et al. | 53/429 |
| 5,772,570 | 6/1998 | Budde et al. | 493/405 |
| 5,775,733 | 7/1998 | Lunt et al. | 280/743.1 |
| 5,782,737 | 7/1998 | Warner | 493/405 |

FOREIGN PATENT DOCUMENTS 4-8647  1/1992  Japan .

Primary Examiner—Michael J. Carone
Assistant Examiner—Darren Ark
Attorney, Agent, or Firm—Pillsbury Madison & Sutro LLP

[57] ABSTRACT

A method of folding up an air bag comprises the steps of: folding up the horizontally-spread air bag crosswise so as to decrease its width crosswise; extending left and right regions on the center side of the air bag in the outer diagonally-upward direction; folding up both left and right end sides of the air bag in the outer diagonally-downward position of the left and right regions; setting the left and right regions close to the center of the air bag so that the left and right regions are extended upward; and moving both folded end sides to the center of the air bag and outside the left and right regions.

9 Claims, 12 Drawing Sheets

METHOD AND APPARATUS FOR FOLDING UP AIR BAG

FIELD OF THE INVENTION

The present invention relates to a method and apparatus for folding up an air bag beforehand when the air bag is integrated into an air bag device fitted to an automotive steering wheel or the like.

BACKGROUND OF THE INVENTION

Heretofore, there is a known method and apparatus for folding up an air bag as disclosed in Japanese Patent Publication No. Hei. 4-8647. The conventional folding method comprises the steps of, as shown in FIG. 1, folding a horizontally-spread air bag crosswise into the figure of a bellows so as to decrease its width crosswise and, as shown in FIG. 2, folding the air bag folded up lengthwise by folding it down the middle into the figure of a bellows.

Under the conventional folding method, however, such an air bag is allowed to easily jut upward in the initial stage of its inflation and in order to improve this point, it was contrived to fold an air bag lengthwise in the form of FIG. 3 (Japanese Patent Application No. Hei. 6-162360).

The profile of the air bag thus folded up crosswise and lengthwise according to the improved version above shows that left and right regions 3, 4 near the center of the air bag 2 folded up crosswise come closer to each other toward the center thereof and subsequently extend upward, whereas both the left and right end sides 5, 6 of the air bag 2 folded up crosswise are arranged outside the left and right regions 3, 4 on the center side thereof, respectively.

When the air bag is folded into the aforementioned profile by means of the folding apparatus equipped with a conventional folding bar, the folding operation is to be performed from the central regions 3, 4 of the air bag to both the left and right end sides 5, 6 in sequence. However, a great deal of tension is applied when both the left and right end sides 5, 6 are folded up, which results in holding the folding bar unmovable. Consequently, the automated operation of folding air bags still remains unfeasible.

SUMMARY OF THE INVENTION

An object of the present invention made to solve the foregoing problem is to provide a method and apparatus for automatically and readily folding up an air bag into an improved folded profile.

In a first aspect of the invention, there is provided with a method of folding up an air bag comprising the steps of: folding up the horizontally-spread air bag crosswise so as to decrease its width crosswise; extending left and right regions on the center side of the air bag in the outer diagonally-upward direction; folding up both left and right end sides or side portions of the air bag in the outer diagonally-downward position of the left and right regions; setting the left and right regions close to the center of the air bag so that the left and right regions are extended upward; and moving both folded end sides to the center of the air bag and outside the left and right regions.

In a second aspect of the invention, there is provided with an apparatus for folding up an air bag comprising: a crosswise-folding unit for folding up the air bag crosswise; and a lengthwise-folding unit for folding up the air bag lengthwise; wherein the lengthwise-folding unit comprises: a work board for supporting the air bag folded up crosswise on the surface thereof; two clamp means for clamping two boundary regions between the center side and the left and right end sides of the air bag folded up crosswise above the work board, the clamp means being capable of horizontally moving while clamping the two boundary regions; and two first lengthwise-folding bars which are arranged between the work board and the respective clamp means in the vertical direction, and outward of the work board and the respective clamp means in the horizontal direction, the first lengthwise-folding bars being capable of moving horizontally.

More specifically, the folding method according to the present invention comprises the steps of first folding up both the left and right end sides of the air bag and moving the folding regions to the center side thereof so as to complete the folding operation, in consideration of the fact that the tension applied to the air bag may make it difficult to fold up both the left and right end sides at the end of the folding sequence if the air bag, after being folded up crosswise, is folded up from the center side up to both the left and right end sides when the air bag is folded up lengthwise into an improved folded profile. Therefore, such tension is hardly applied to each region to be folded up, so that the air bag can simply be folded up when the folding apparatus is used for folding up the air bag.

Further, the folding apparatus according to the present invention is provided with the pair of clamp means and that of lengthwise-folding bars on the work board. The clamp means are used for extending the left and right regions on the center side of the air bag folded up crosswise in the outer diagonally-upward direction to put the air bag in standby condition, and the lengthwise-folding bars are used for folding up both the left and right end sides of the crosswise folded air bag. Further, not only the mutual lengthwise-folding bars but also the mutual clamp means are moved to the center side, whereby the air bag can be folded up into the improved folded profile.

Therefore, the method and apparatus for folding up an air bag according to the present invention are capable of readily and automatically folding up the air bag into the improved folded profile.

DETAILED DESCRIPTION OF THE PREFERRED EMBODIMENT

An embodiment of the present invention will subsequently be described by reference to the drawings.

Figure 1:
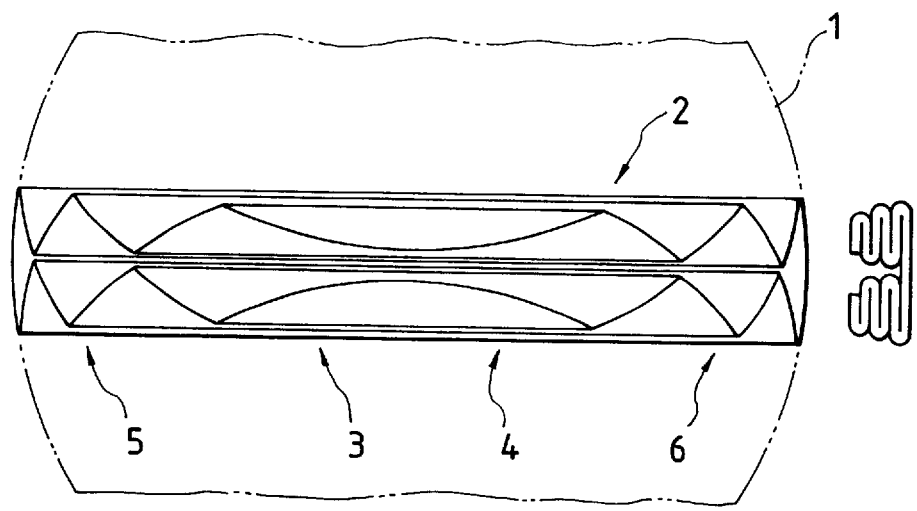
FIG. 1 is a top view of a conventional air bag folded up crosswise and a schematic side view showing the folded up condition.
Figure 2:
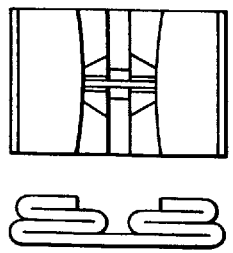
FIG. 2 is a top view of the conventional air bag folded up lengthwise and a schematic side view showing the folded up condition.
Figure 3:
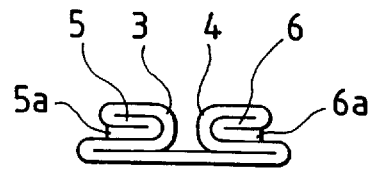
FIG. 3 is a schematic side view showing an improved folded up profile of an air bag folded up lengthwise.
Figure 4:
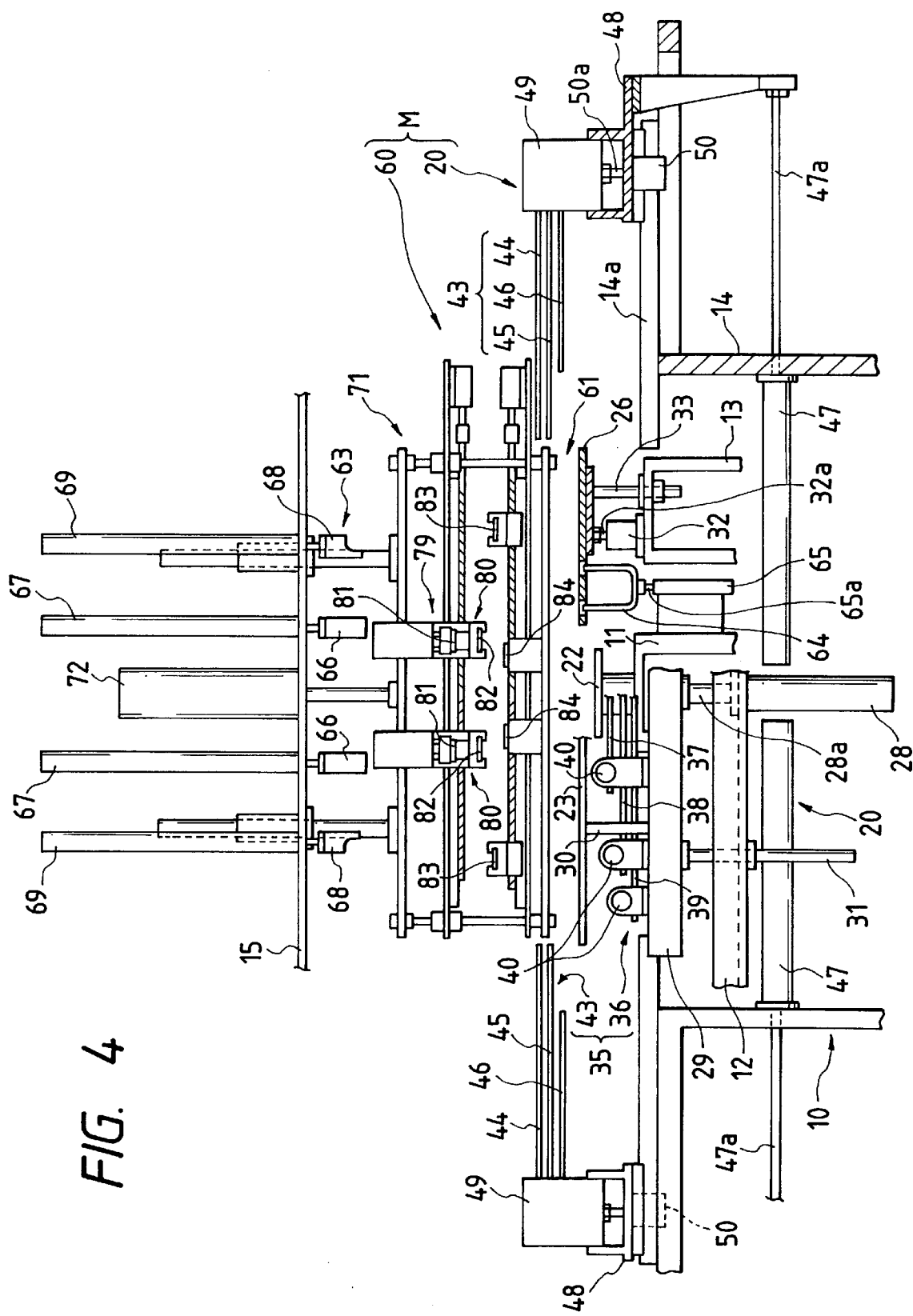
FIG. 4 is a schematic semi-sectional elevational view of a folding apparatus embodying the present invention.
Figure 5:
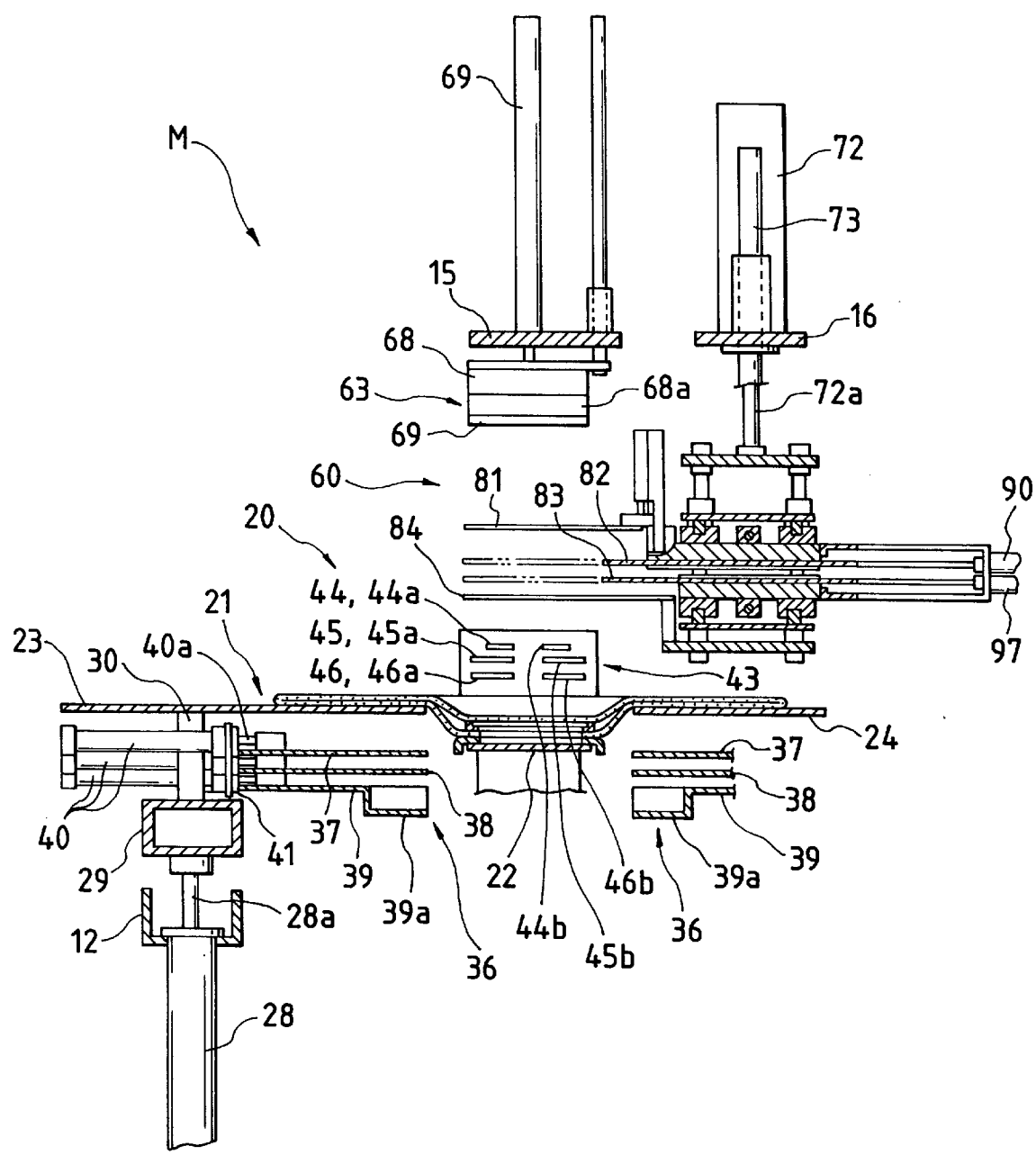
FIG. 5 is a schematic partial sectional side view of the folding apparatus according to the embodiment of the invention.
Figure 6:
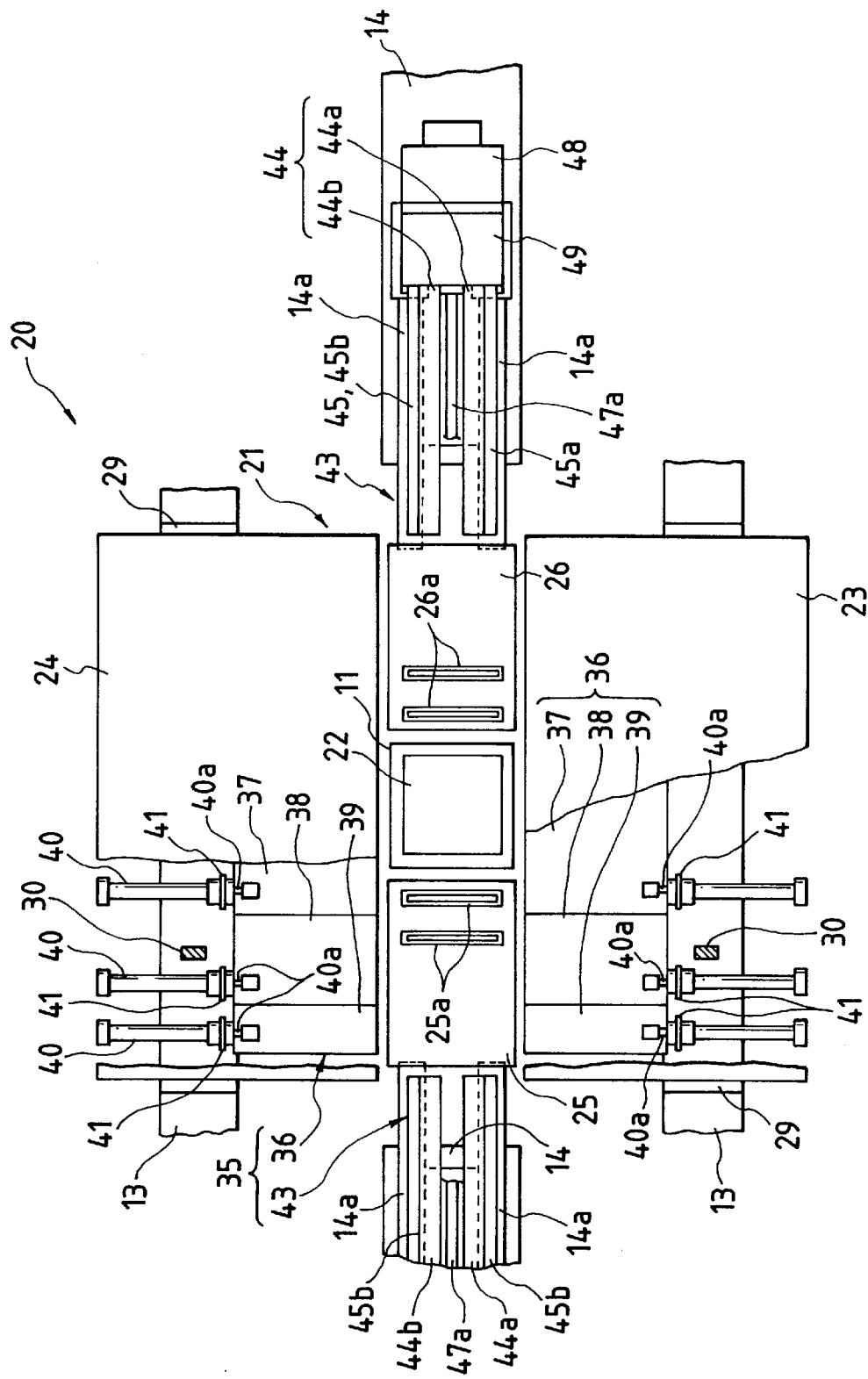
FIG. 6 is a schematic top view of the crosswise-folding unit in the folding apparatus according to the embodiment of the invention.
Figure 7:
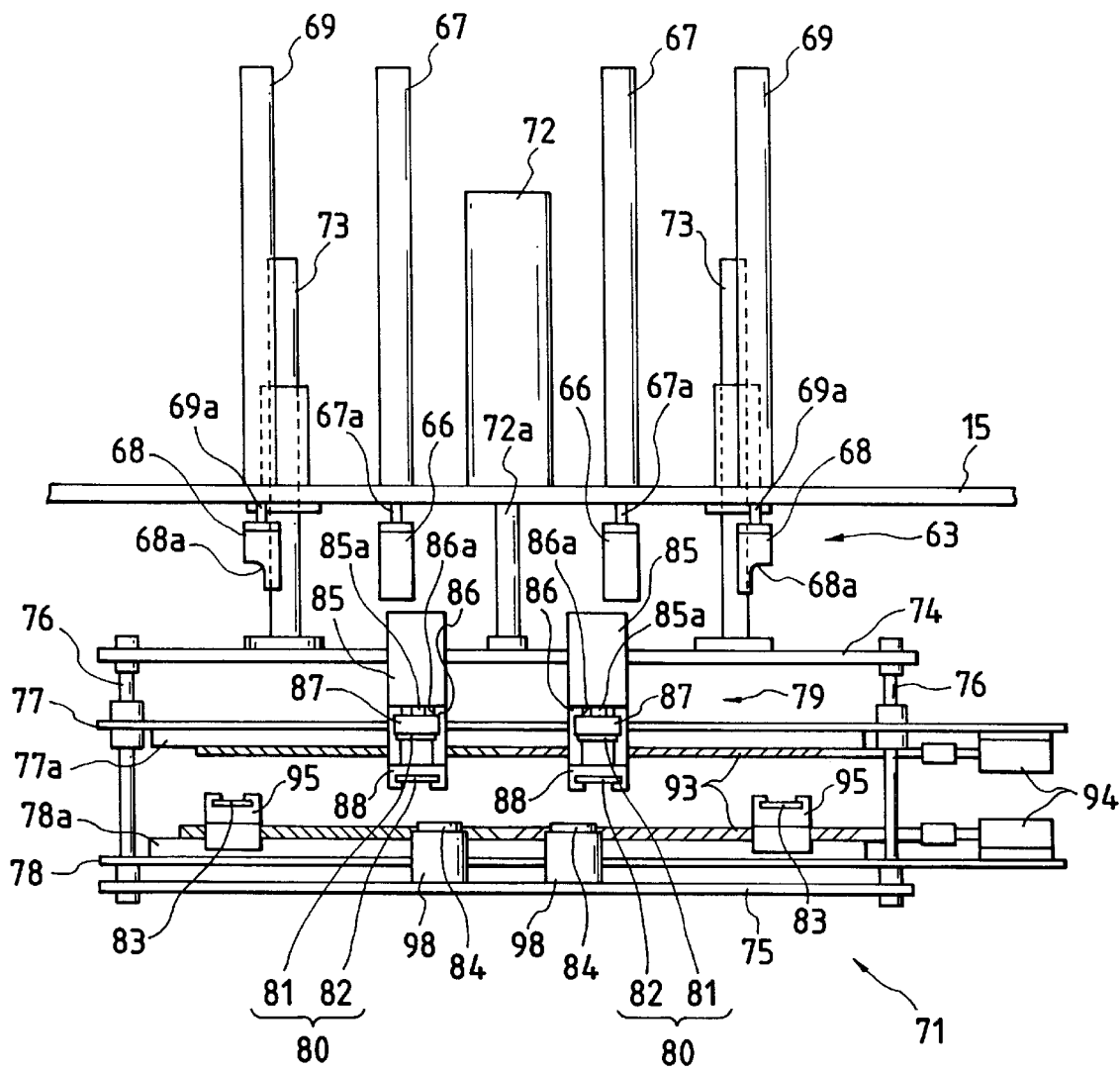
FIG. 7 is a schematic elevational view of the lengthwise-folding bar unit in the folding apparatus according to the embodiment of the invention.
Figure 8:
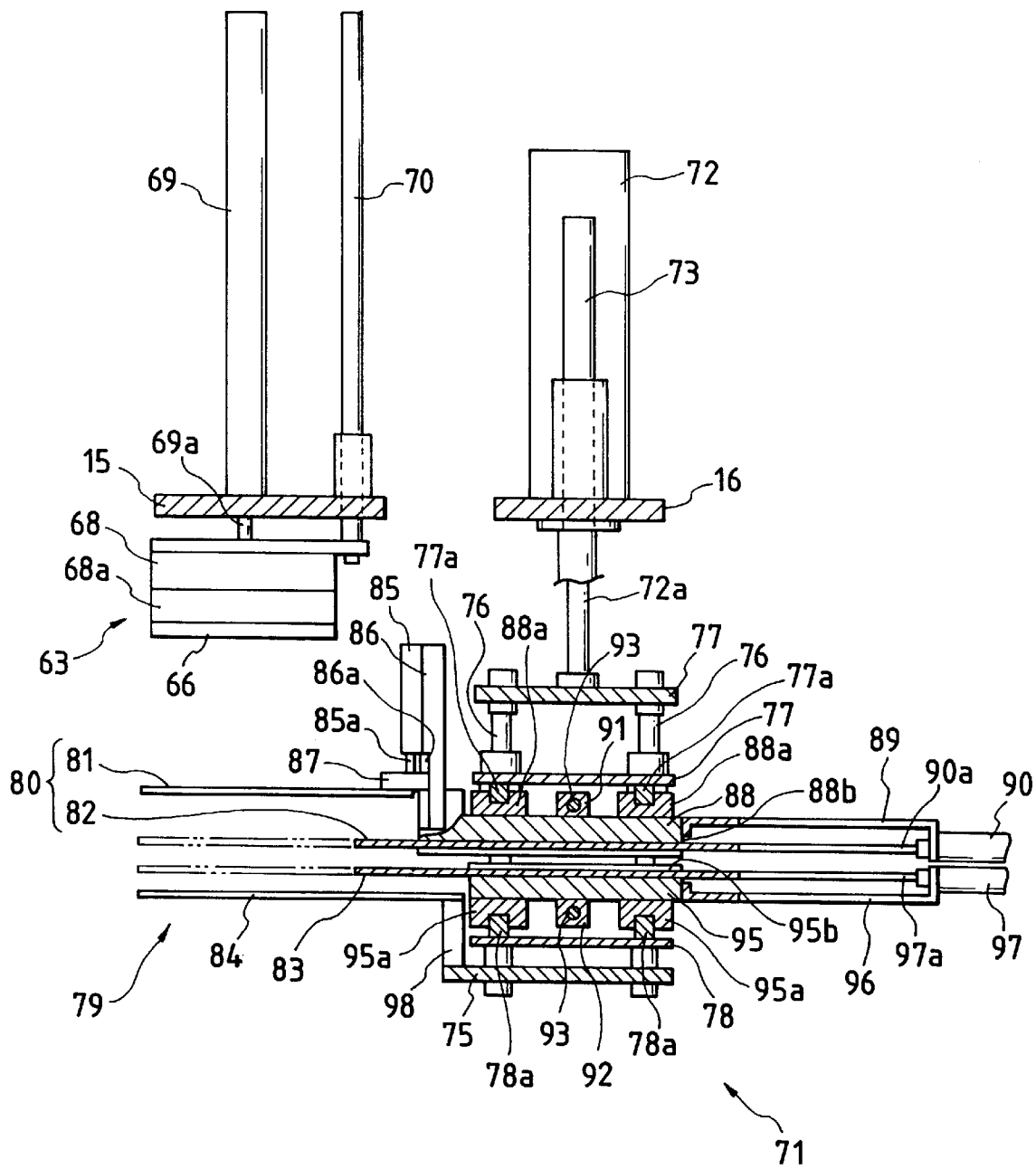
FIG. 8 is a schematic partial sectional side view of the lengthwise-folding bar unit in the folding apparatus according to the embodiment of the invention.

A folding apparatus M for use according to this embodiment of the invention is, as shown in FIGS. 4 to 6, provided with a crosswise-folding unit 20 and a lengthwise-folding unit 60.

The crosswise-folding unit 20 is equipped with a workboard 21 and groups of crosswise-folding bars 35.

The workboard 21 includes a central setting board 22, a front and a rear board 23, 24 each arranged in front and in the rear of the setting board 22, and a left and a right board 25, 26 arranged to the left and to the right of the setting board 22.

Figure 9:
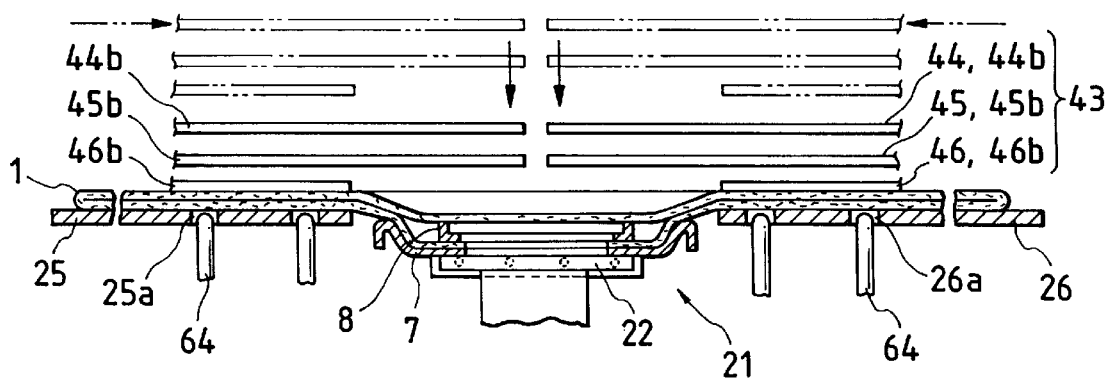
FIG. 9 is a partial elevational view showing the initial stage of the crosswise-folding condition in the crosswise-folding unit of the folding apparatus according to the embodiment of the invention.
Figure 10:
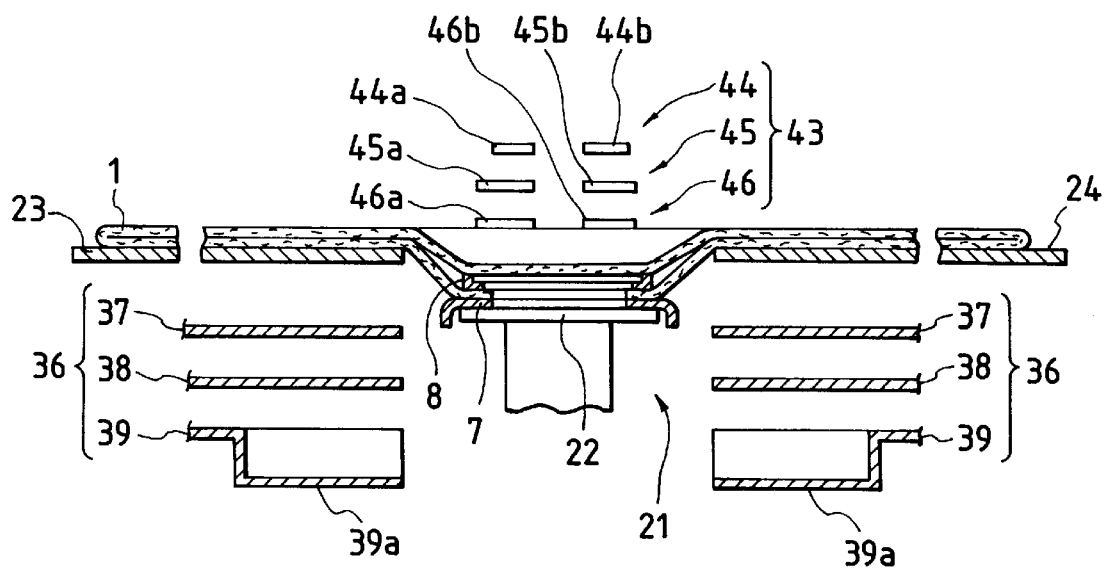
FIG. 10 is a partial sectional side view showing the initial stage of the crosswise-folding condition in the crosswise-folding unit of the folding apparatus according to the embodiment of the invention.

The central setting board 22 is secured to a first frame 11 installed horizontally in a frame 10 of the apparatus M and disposed at a predetermined height and used as a region where an air bag 1 is rigidly fixed. When the air bag 1 is folded up by this apparatus M, it is, as shown in FIGS. 9, 10, fitted to a bag holder 7 by utilizing an annular retainer 8, and fitted and fixed to the setting board 22 by utilizing a projection and the like (not shown) projecting from the retainer 8 or the bag holder 7.

The front and rear boards 23, 24 are held by holding boards 29 each installed laterally under the boards 23, 24 via coupling columns 30, and the holding boards 29 are each coupled to the piston rods 28a of first perpendicular cylinders 28. Each of the first perpendicular cylinders 28 is vertically and rigidly fixed to a second frame 12 horizontally installed in the frame 10 of the apparatus M. The first perpendicular cylinder 28 is air-operated and according to this embodiment of the invention, cylinders 32, 40, 47 and so on, which will be described later, are all air-operated. Further, reference numeral 31 of FIG. 4 denotes a guide rod rigidly coupled to each holding board 29 and passed through the second frame 12.

The left and right boards 25, 26 are each held by the piston rods 32a of second perpendicular cylinders 32 fixed to a horizontal third frame 13 in the frame 10. Reference numeral 33 denotes guide rods each rigidly coupled to the boards 25, 26 and passed through the third frame 13.

The left and right boards 25, 26 are each provided with through-holes 25a, 26a through which lifting jigs 64, as will be described later, of the lengthwise-folding unit 60 are passed.

The groups of crosswise-folding bars 35 include a pair of groups of internal crosswise-folding bars 36 longitudinally disposed opposite to each other and a pair of groups of external crosswise-folding bars 43 laterally disposed opposite to each other.

The opposing pairs of internal crosswise-folding bars 36, that extend in the longitudinal direction, are vertically disposed in three tiers on each side as internal crosswise-folding bars 37, 38, 39 with each of the internal crosswise-folding bars 37, 38, 39 being coupled to the piston rods 40a of first horizontal cylinders 40. Each of the first horizontal cylinders 40 is fixed via a bracket 41 to the holding board 29. Moreover, the internal crosswise-folding bars 37, 38, 39 are arranged under the front board 23 or the rear board 24 so that the lower one is laterally wider than the upper one. Further, a stepped portion 39a is formed on the edge of the central part of the lowermost internal crosswise-folding bar 39 so as to prevent the air bag 1 to be folded up crosswise from interfering with a retainer 7.

The opposing pairs of external crosswise-folding bars 43, that also extend in the lateral direction are disposed in three tiers on each side are external crosswise-folding bars 44, 45, 46 vertically disposed in three tiers, each of the external crosswise-folding bars 44, 45, 46 being formed with a pair of bar members 44a, 44b (45a, 45b, 46a, 46b) in the longitudinal direction. The lowermost external bar members 46a, 46b are made laterally shorter than the upper external bar members 44a, 44b, 45a, 45b so as to prevent the bar member 46a, 46b from interfering with the retainer 7 when the air bag 1 is folded up crosswise. Moreover, the bar members 44a, 44b of the uppermost external crosswise-folding bar 44 are longitudinally narrower than the bar members 45a, 45b, 46a, 46b in consideration of the longitudinal width dimension of the air bag 1 to be folded up crosswise. Further, the external crosswise-folding bars 44, 45, 46 on one side are held by holding blocks 49 at their respective outer edges in the lateral direction. Each holding block 49 is coupled to and held by the piston rod 50a of a third perpendicular cylinder 50 rigidly fitted to a trunk 48. Further, the trunk 48 is supported by rails 14a installed laterally in the fourth frame 14 of the frame 10 and coupled to the piston rod 47a of each second horizontal cylinder 47 fixed to the fourth frame 14.

Incidentally, the crosswise-folding unit 20 is similar in construction to what is disclosed in Japanese Patent Publication No. Hei. 4-8647 except that the left and right boards 25, 26 are made to move vertically and each provided with the through-holes 25a, 26a.

The lengthwise-folding unit 60 includes the work board 61, a press unit 63 and a lengthwise-folding bar unit 71 and since the work board 61 is also shared and the letting board 22, and the left and right boards 25, 26 of the crosswise-folding unit 20, the description thereof will be omitted (see FIGS. 4, 5, 7, 8).

The press unit 63 is provided with a pair of lifting jigs 64 and a pair of press jigs 66, 68, each of the pair being set laterally symmetrical.

The lifting jigs 64, which are U-shaped in cross section, are projected upward through the through-holes 25a, 26a of the left and right boards 25, 26, and coupled to the tip of the piston rods 65a of the fourth perpendicular cylinder 65 fixed to the first frame 11.

The press jigs 66 are each arranged above and close to the respective central edges of the left and right boards 25, 26 and coupled to the piston rods 67a of fifth perpendicular cylinders 67. Each of the fifth perpendicular cylinders 67 is fixed to the fifth frame 15 placed above the frame 10.

The press jigs 68 are each equipped with recesses 68a in lower outer sides thereof and disposed laterally above and close to the central part between the left and right boards 25, 26 and besides coupled to the piston rods 69a of sixth perpendicular cylinders 69. Each of the sixth perpendicular cylinders 69 is fixed to the fifth frame 15.

Reference numeral 70 denotes guide rods coupled to the respective press jigs 66, 68 and passed through the fifth frame 15.

The lengthwise-folding bar unit 71 is provided with groups of lengthwise-folding bars 79 including eight lengthwise-folding bars 81, 82, 83, 84 arranged between upper and lower plates 74, 75. The upper and lower plates 74, 75 whose four corners are each coupled together with tie rods 76 are arranged so that they are moved vertically by a seventh perpendicular cylinder 72 fixed to a sixth frame 16 in the rear of the fifth frame 15. Each tie rod 76 is installed so that an upper intermediate plate 77 and a lower intermediate plate 78 are fixed in between the upper and lower plates 74, 75.

In FIG. 5, reference numeral 73 denotes a guide rod which is fixed to the upper plate 74 and used for guiding the upper and lower plates, 74, 75, the guide rod 73 being inserted through the sixth frame 16.

The group of lengthwise-folding bars 79 includes longitudinally-directed four sets of lengthwise-folding bars 81, 82, 83, 84 arranged downward in order, a lateral pair of them constituting each set. The upper and lower lengthwise-folding bars 81, 82 situated vertically opposite to each other also constitute a clamp means 80 for clamping the air bag 2 folded up crosswise.

The pair of lengthwise-folding bars 81 are such that one side of each lengthwise-folding bar 81 is held by a holding block 87 on the rear side. Each holding block 87 engages with a rail 86a formed in the vertical direction of a bracket 86 and is coupled to the lower end of the piston rod 85a of an eighth perpendicular cylinder 85. Each of the eighth perpendicular cylinders 85 is fixed to the bracket 86, which is rigidly coupled to a holding block 88.

The pair of lengthwise-folding bars 82 are such that one side of each lengthwise-folding bar 82 is made to pass through the guide groove 88b of the holding block 88. Each holding block 88 is equipped with a guide portion 88a, which engages with a rail 77a placed in the lateral as well as the horizontal direction of the intermediate plate 77. Further, a bracket 89 is fixed on the rear side of each holding block 88, and each third horizontal cylinder 90 longitudinally disposed is fixed to the bracket 89, whereas the piston rod 90a of the third horizontal cylinder 90 is coupled to the rear end of the lengthwise-folding bar 82.

Further, internal thread members 91 whose spiral thread has been reversed laterally are each secured to the lateral holding blocks 88, and a screw rod 93 corresponding to the internal thread engages with each internal thread member 91. A motor 94 is coupled to the screw rod 93.

Therefore, each lengthwise-folding bar 81 vertically moves as the eighth perpendicular cylinder 85 operates, whereas each lengthwise-folding bar 82 longitudinally moves as the third horizontal cylinder 90 operates. When the screw rod 93 rotates in the predetermined direction in accordance with the operation of the motor 94, moreover, individual sides of the respective lengthwise-folding bars 81, 82 become integral with each other and are caused to move closer to or away from the center side. In this case, each lengthwise-folding bar 82 moves to the rear side as the initial position and remains in standby condition.

The pair of lengthwise-folding bars 83 are such that one side of each lengthwise-folding bar 83 is made to pass through the guide groove 95b of a holding block 95. Each holding block 95 is equipped with a guide portion 95a, which engages with a rail 78a placed in the lateral as well as the horizontal direction of the intermediate plate 78. Further, a bracket 96 is fixed on the rear side of each holding block 95, and each fourth horizontal cylinder 97 longitudinally disposed is fixed to the bracket 96, whereas the piston rod 97a of the fourth horizontal cylinder 97 is coupled to the rear end of the lengthwise-folding bar 83.

Further, internal thread members 92 whose spiral thread has been reversed laterally are each secured to the lateral holding blocks 95, and a screw rod 93 corresponding to the internal thread engages with each internal thread member 92, a motor 94 being coupled to the screw rod 93.

Therefore, each of the lengthwise-folding bars 83 also moves back and forth as the fourth horizontal cylinder 97 operates and when the screw rod 93 rotates in the predetermined direction as the motor 94 operates, the lengthwise-folding bars 83 mutually moves closer to and away from the center side. Incidentally, each lengthwise-folding bar 83 moves back to the initial position where it remains in standby condition.

The pair of lengthwise-folding bars 84 are each arranged above the lateral edges of the setting board 22 and one side of each lengthwise-folding bar 84 is held by a holding block 98. Each holding block 98 is fixed to the lower plate 75.

The operation of the folding apparatus M will subsequently be described. First, the retainer 8 and the bag holder 7 are fitted to the air bag 1, and the air bag 1 spread in the form of a disk is fitted and fixed to the setting board 22 by utilizing the projection or the like (not shown) projecting from the retainer 8 or the bag holder 7.

The air bag 1 thus spread is, as shown in FIGS. 9, 10, also mounted on the front board 23, the rear board 24, the left board 25 and the right board 26; the front board 23, the rear board 24, the left board 25 and the right board 26 are arranged slightly above the setting board 22. Further, a control unit (not shown) successively controls air sources and electromagnetic valves of air circuits communicating with the atmosphere so as to operate the cylinders 28, 32, 40, 47, 50, 65, 67, 69, 72, 85, 90, 97.

Subsequently, the second horizontal cylinders 47 and the third perpendicular cylinders 50 are operated to make the opposed outer crosswise-folding bars 44, 45, 46 in the groups of the outer crosswise-folding bars 43 move closer to the center side and lower, whereby the air bag 1 is pressed against the left and right boards 25, 26 at the lowermost outer crosswise-folding bars 46.

Figure 11:
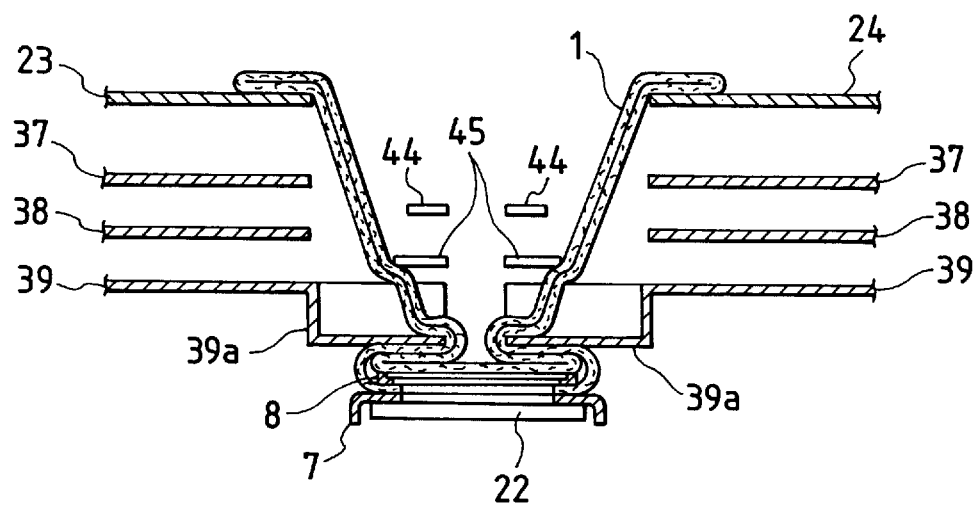
FIG. 11 is a partial sectional side view showing the crosswise-folding condition in the crosswise-folding unit of the folding apparatus according to the embodiment of the invention, namely, the condition following what is shown in FIG. 10.

Then the first horizontal cylinders 40 of the inner crosswise-folding bars 39 simultaneously with the first perpendicular cylinders 28 are operated to move up the front and rear boards 23, 24 and groups of the inner crosswise-folding bars 36 so as to lift the peripheral edge of the air bag 1. As shown in FIG. 11, further, the outer crosswise-folding bars 44 are placed between the inner crosswise-folding bars 37, 38, whereas the outer crosswise-folding bars 45 are placed between the inner crosswise-folding bars 38, 39. Further, the stepped portions 39*a* of the inner crosswise-folding bars 39 are mutually moved closer to the center side. Since the outer crosswise-folding bars 46 are laterally shorter than the outer crosswise-folding bars 44, 45, the outer crosswise-folding bars 46 are positioned between the left and right boards 25, 26 and the inner crosswise-folding bars 39 at outer positions separated from the stepped portions 39*a* of the inner crosswise-folding bars 39 in a region slightly laterally separated from the center of the air bag 1 (see FIG. 13).

Figure 12:
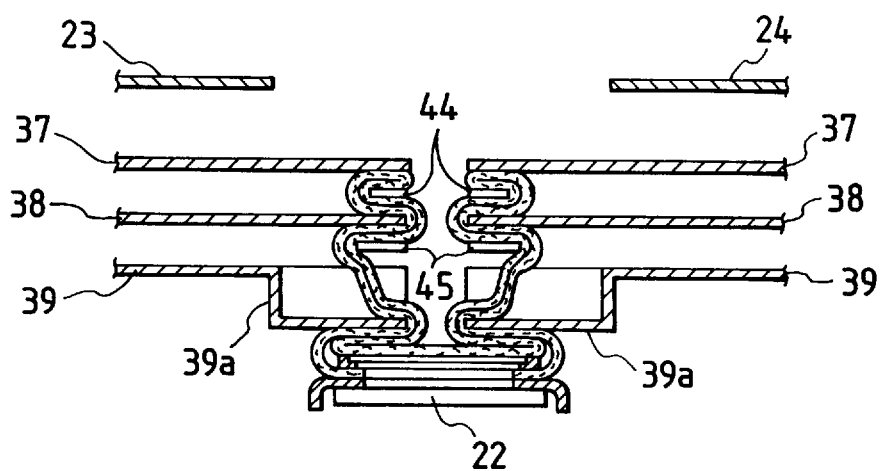
FIG. 12 is a partial sectional side view of the central regions, showing the completion of the crosswise-folding operation by means of the crosswise-folding unit of the folding apparatus according to the embodiment of the invention, namely, the condition following what is shown in FIG. 11.
Figure 13:
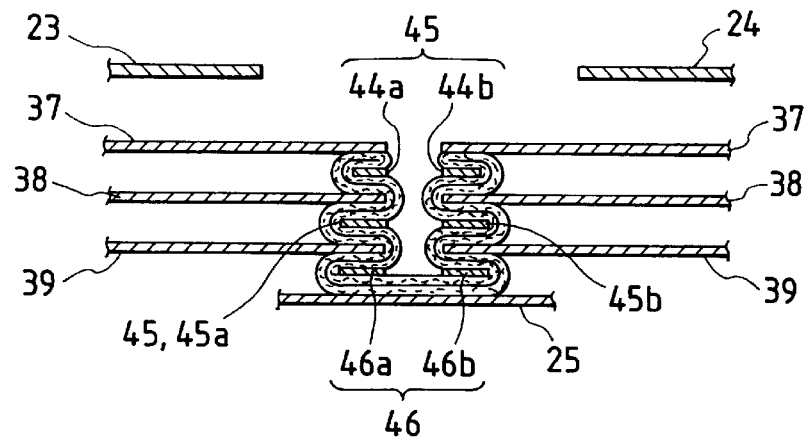
FIG. 13 is a partial sectional side view of the regions deviating from the central regions, showing the completion of the crosswise-folding operation by means of the crosswise-folding unit of the folding apparatus according to the embodiment of the invention.

Subsequently, the first horizontal cylinders 40 of the inner crosswise-folding bars 37, 38 are operated to move the inner crosswise-folding bars 37, 38 mutually closer to the center side as shown in FIGS. 12, 13. At this time, the air bag 1 is caused to slide on the surface and under surface of the inner crosswise-folding bars 37, 38, 39, the outer crosswise-folding bars 44, 45, 46, and the left and right boards 25, 26. The air bag 1 is thus folded up crosswise.

Figure 14:
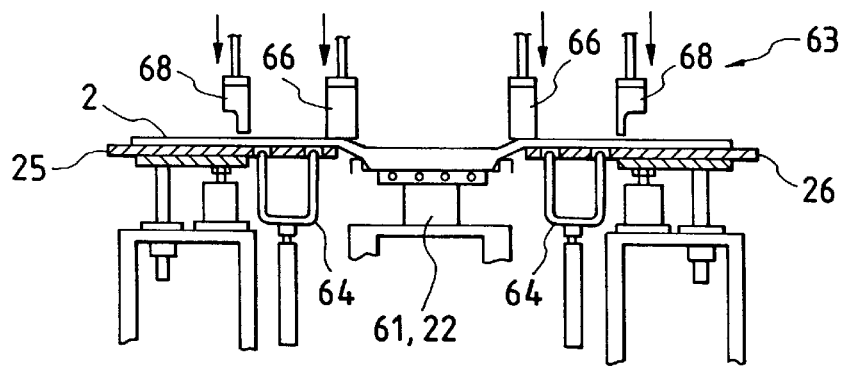
FIG. 14 is a partial elevational view showing the initial stage of the lengthwise-folding condition in the lengthwise-folding unit of the folding apparatus according to the embodiment of the invention.

Subsequently, the fifth and sixth perpendicular cylinders 67, 69 of the lengthwise-folding unit 60 are operated to lower the press jigs 66, 68 and while the air bag 2 thus folded up crosswise, the first and second horizontal cylinders 40, 47 of the crosswise-folding unit 20 are reset, whereby each of the crosswise-folding bars 37, 38, 39, 44, 45, 46 are pulled out (see FIG. 14).

Figure 15:
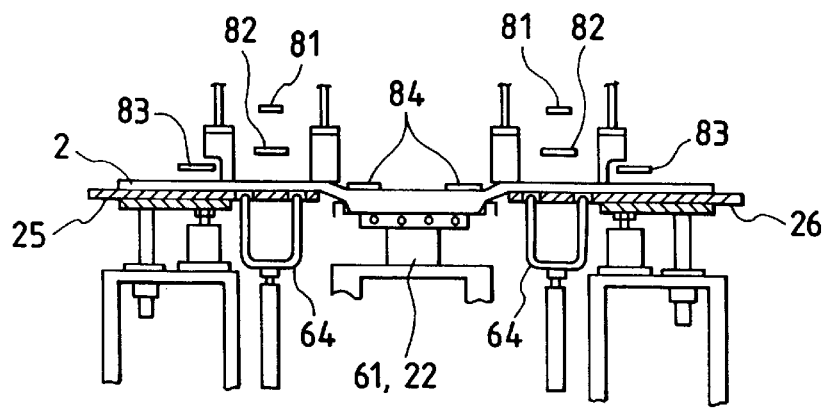
FIG. 15 is a partial sectional elevational view showing the lengthwise-folding condition in the lengthwise-folding unit of the folding apparatus according to the embodiment of the invention, namely, the condition following what is shown in FIG. 14.

Then the seventh perpendicular cylinders 72 are operated to lower the lengthwise-folding bar unit 71 and, as shown in FIG. 15, the vicinity of the central part of the air bag 2 is pressed by the lengthwise-folding bars 84. At this time, the lengthwise-folding bars 82, 83 are kept in the backward standby position.

Figure 16:
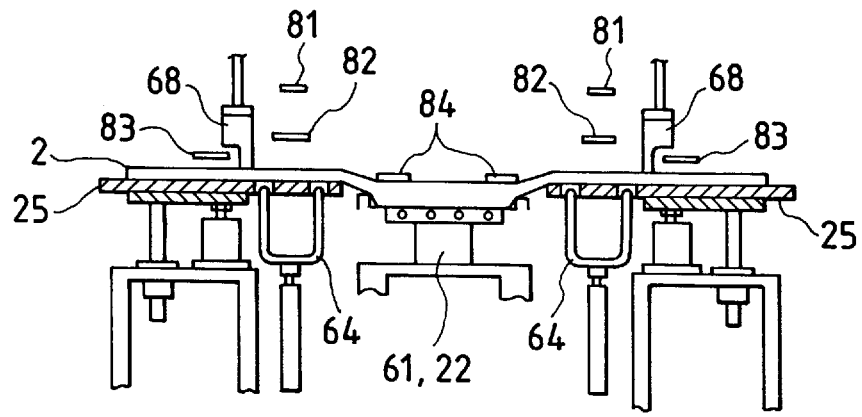
FIG. 16 is a partial sectional elevational view showing the lengthwise-folding condition in the lengthwise-folding unit of the folding apparatus according to the embodiment of the invention, namely, the condition following what is shown in FIG. 15.

Further, the fifth perpendicular cylinders 67 are reset and the press jigs 66 are moved up and reset to the original position as shown in FIG. 16.

Figure 17:
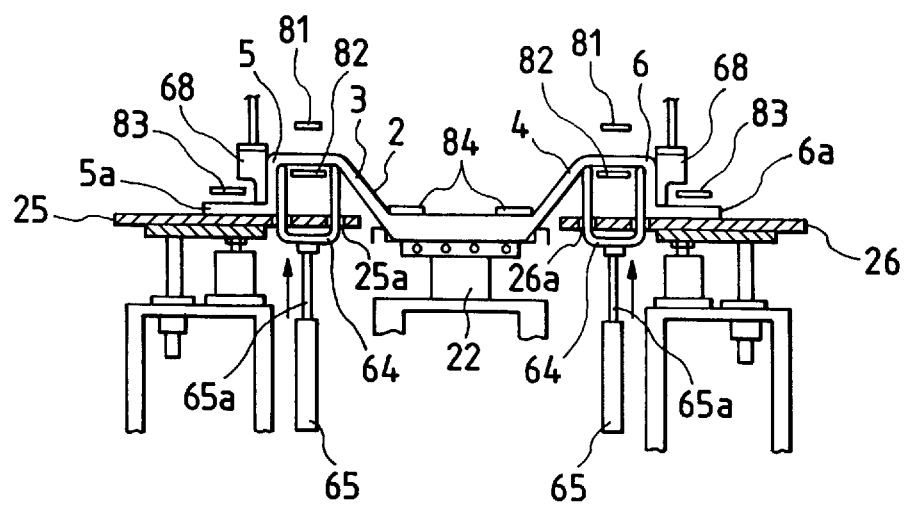
FIG. 17 is a partial sectional elevational view showing the lengthwise-folding condition in the lengthwise-folding unit of the folding apparatus according to the embodiment of the invention, namely, the condition following what is shown in FIG. 16.

As shown in FIG. 17, the fourth perpendicular cylinders 65, third horizontal cylinders 90 and the fourth horizontal cylinders 97 are operated to move up the press jigs 64, and the lengthwise-folding bars 82, 83 that have been retracted are moved forward. At this time, the lengthwise-folding bars 82 are disposed against the under surface of the boundary between the left and right regions 3, 4 on the center side of and the left and right end sides 5, 6 of the air bag 2 in the lifting jigs 64. Moreover, the lengthwise-folding bars 83 are moved forward and disposed above the left and right end portions 5*a*, 6*a* since the air bag 2 is pulled and its left and right end portions 5*a*, 6*a* are moved to the center side as the lifting jigs 64 move up.

Figure 18:
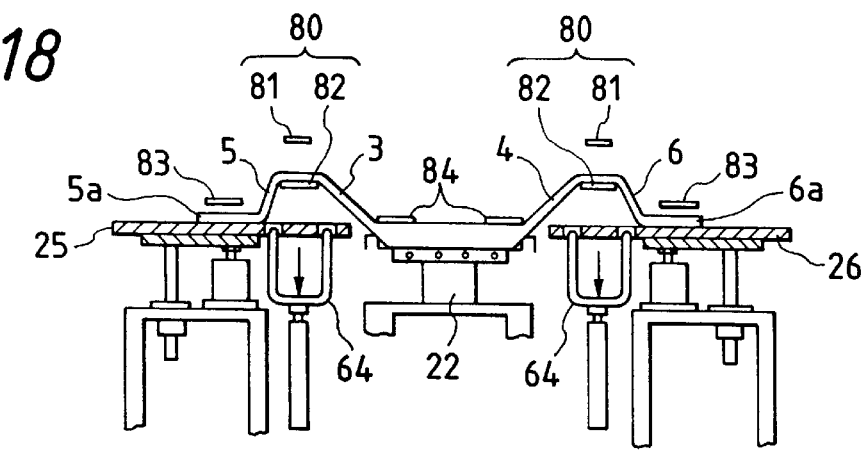
FIG. 18 is a partial sectional elevational view showing the lengthwise-folding condition in the lengthwise-folding unit of the folding apparatus according to the embodiment of the invention, namely, the condition following what is shown in FIG. 17.

As shown in FIG. 18, the fourth and sixth perpendicular cylinders 65, 69 are reset so as to lower the lifting jigs 64 and move up the press jigs 68, whereby these jigs are reset to the respective original positions.

Figure 19:
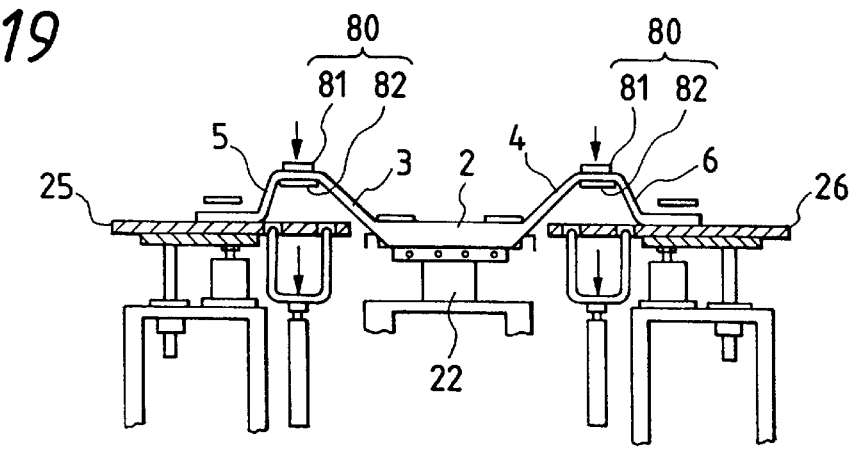
FIG. 19 is a partial sectional elevational view showing the lengthwise-folding condition in the lengthwise-folding unit of the folding apparatus according to the embodiment of the invention, namely, the condition following what is shown in FIG. 18.

As shown in FIG. 19, further, the eighth perpendicular cylinders 85 is operated to lower the lengthwise-folding bars 81, so that the boundary between the left and right regions 3, 4 on the center side of and the left and right sides 5, 6 of the air bag 2 is clamped by the lengthwise-folding bars 81, 82.

Figure 20:
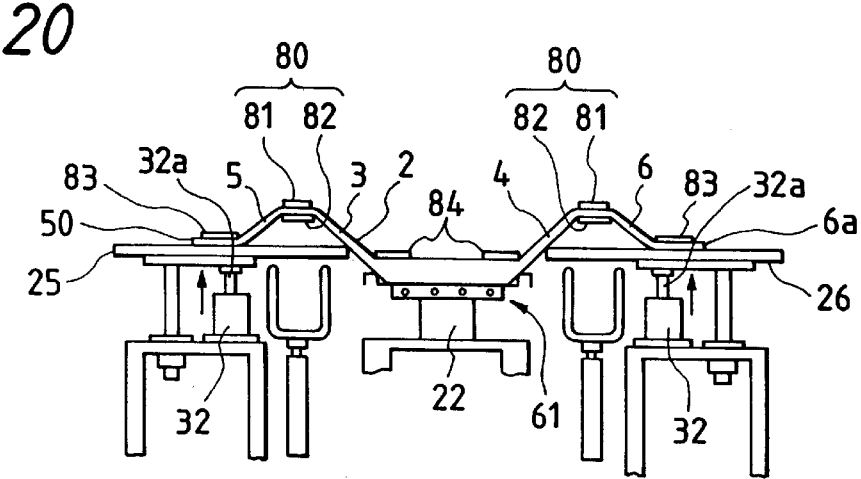
FIG. 20 is a partial sectional elevational view showing the lengthwise-folding condition in the lengthwise-folding unit of the folding apparatus according to the embodiment of the invention, namely, the condition following what is shown in FIG. 19.

As shown in FIG. 20, further, the second perpendicular cylinders 32 are operated to move up the left and right boards 25, 26, and the left and right end portions 5*a*, 6*a* of the air bag 2 are pressed by the lengthwise-folding bars 83.

Figure 21:
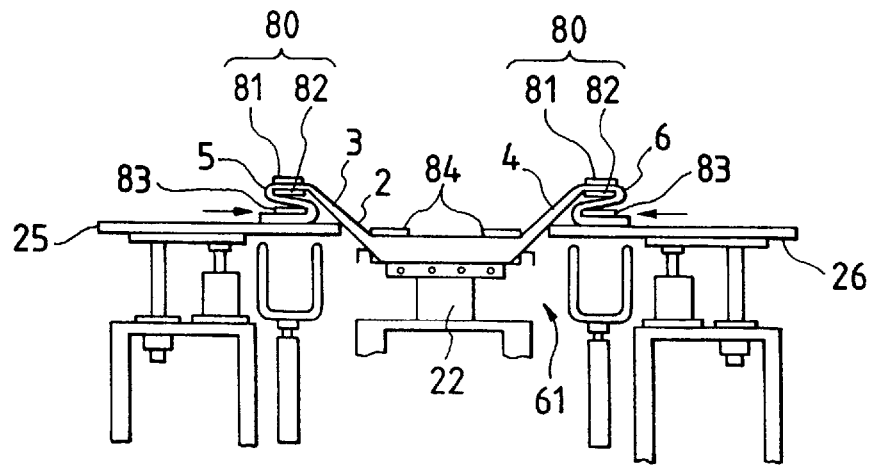
FIG. 21 is a partial sectional elevational view showing the lengthwise-folding condition in the lengthwise-folding unit of the folding apparatus according to the embodiment of the invention, namely, the condition following what is shown in FIG. 20.

As shown in FIG. 21, further, the motor 94 on the sides of the lengthwise-folding bars 83 is operated in the predetermined direction to make the lengthwise-folding bars 83 move closer to each other so as to dispose the lengthwise-folding bars 83 under the respective lengthwise-folding bars 82. At this time, the left end side 5 and the right end side 6 of the air bag 2 are folded up.

Figure 22:
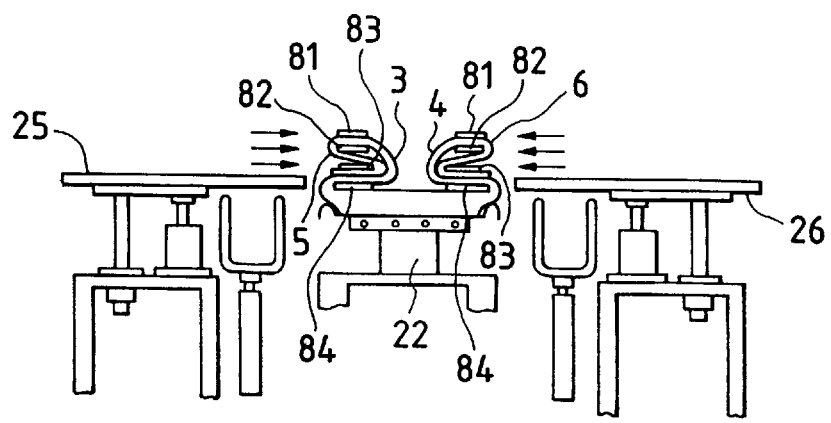
FIG. 22 is a partial sectional side view, showing the completion of the lengthwise-folding operation by means of the crosswise-folding unit of the folding apparatus according to the embodiment of the invention.

As shown in FIG. 22, further, the motor 94 on the side of the lengthwise-folding bars 82 and the motor 94 on the side of the lengthwise-folding bars 83 are operated in the predetermined direction to make the lengthwise-folding bars 81, 82 together with the lengthwise-folding bars 83 move closer to each other, whereby the air bag 2 is folded up lengthwise.

Then the seventh perpendicular cylinders 72 are operated to slightly move up the lengthwise-folding bar unit 71 so as to remove the air bag 2 from the setting board 22. When the operator pulls the folded up air bag 2 out of the lengthwise-folding bars 81, 82, 83, 84, the completely folded up air bag 2 can be obtained.

The lengthwise-folding unit 60 thus arranged according to this embodiment of the invention is equipped with the pair of clamp means 80 and that of lengthwise-folding bars 83 above the work board 61. While the clamp means 80 are used to extend in an upper outer diagonal direction, the left and right regions 3, 4 on the center side of the air bag 2 are folded up crosswise so as to set the regions in standby condition as shown in FIG. 20, the lengthwise-folding bars 83 are used to fold up both the left and right end sides 5, 6 of the air bag 2 folded up crosswise as shown in FIG. 21. Subsequently, the mutual lengthwise-folding bars 83 are moved to the center side as shown in FIG. 22 and the mutual clamp means 80 are also moved thereto, whereby the air bag 2 can be folded up in an improved folded profile. In other words, air bags in such an improved profile are readily and automatically obtainable.

Although the fourth perpendicular cylinders 65 are operated to move up and down, the lifting jigs 64 before the eighth perpendicular cylinders 85 are operated to lower the lengthwise-folding bars 81 as shown in FIGS. 17, 18 according to this embodiment of the invention, the number of folding steps can be decreased by operating the eighth perpendicular cylinders 85 to lower the lengthwise-folding bars 81 when the lifting jigs 64 are moved up.

Moreover, the second perpendicular cylinders 32 are operated to make the left and right boards 25, 26 move up and to press the left and right end portions 5*a*, 6*a* of the air bag 2 with the lengthwise-folding bars 83 when the left and right end sides 5, 6 of the air bag 2 are folded up by setting the lengthwise-folding bars 83 closer to the center side thereof according to this embodiment of the invention, so that creases in the air bag can be put neatly. Incidentally, the lengthwise-folding bars 83 may be moved simply to the center side for the purpose without using them to press the left and right side portions 5*a*, 6*a* of the air bag 2 provided the effect of making the creases appear neat is disregarded.

What is claimed is:

1. An apparatus for folding up an air bag comprising:
   a crosswise-folding unit for folding up said air bag crosswise; and
   a lengthwise-folding unit for folding up said air bag lengthwise;
   wherein said lengthwise-folding unit comprises:
     a work board for supporting said air bag folded up crosswise on a surface thereof;
     clamp means for clamping two boundary areas between a central part and left and right end portions, respectively, of said crosswise-folded air bag above said work board, said clamp means being capable of horizontally moving while clamping said two boundary regions; and
     a first set of lengthwise-folding bars which are arranged between said work board and said respective clamp means in the vertical direction, and outward of said respective clamp means in the horizontal direction, said first set of lengthwise-folding bars being capable of moving horizontally
     wherein, when said clamp means clamp said two boundary areas above said first set of lengthwise-folding bars, said first set of lengthwise-folding bars move toward the central part of said crosswise-folded air bag to fold up said left and right end portions under said first set of lengthwise-folding bars and said two boundary areas, and said clamp means and said first set of lengthwise-folding bars move together to fold up said left and right end portions, respectively, between said two boundary areas and the central part.

2. The apparatus for folding up an air bag according to claim 1, wherein said clamp means comprise:
   a second set of lengthwise-folding bars; and
   a third set of lengthwise-folding bars disposed just below said second set of lengthwise-folding bars.

3. The apparatus for folding up an air bag according to claim 2, further comprising: a fourth set of lengthwise-folding bars which are arranged inward of said respective clamp means in the horizontal direction, said fourth set of lengthwise-folding bars pressing a vicinity of the central part of said crosswise-folded air bag.

4. The apparatus for folding up an air bag according to claim 1, further comprising: two first perpendicular cylinders which are respectively arranged inward of said respective clamp means in the horizontal direction, said two first perpendicular cylinders being capable of vertically moving.

5. The apparatus for folding up an air bag according to claim 4, further comprising: two second perpendicular cylinders which are respectively arranged between said respective clamp means and said first set of lengthwise-folding bars in the horizontal direction, said two second perpendicular cylinders being capable of vertically moving.

6. The apparatus for folding up an air bag according to claim 1, further comprising: press-up means for pressing up said two boundary areas, said press-up means being respectively arranged vertically below said respective clamp means and capable of vertically moving.

7. The apparatus for folding up an air bag according to claim 1, further comprising: left and right boards which are arranged outward of said work board, said left and right boards supporting the left and right end portions of said air bag and being capable of vertically moving.

8. An apparatus for folding up an air bag comprising:
   a crosswise-folding unit for folding up said air bag crosswise; and
   a lengthwise-folding unit for folding up said air bag lengthwise;
   wherein said lengthwise-folding unit comprises:
     a work board for supporting said air bag folded up crosswise on a surface thereof;
     clamp means for clamping two boundary areas between a central part and left and right end portions, respectively, of said crosswise-folded air bag above said work board, said clamp means being capable of horizontally moving while clamping said two boundary regions; and
     a first set of lengthwise-folding bars which are arranged between said work board and said respective clamp means in the vertical direction, and outward of said respective clamp means in the horizontal direction, said first set of lengthwise-folding bars being capable of moving horizontally
     wherein, when said clamp means clamp said two boundary areas above said first set of lengthwise-folding bars, said first set of lengthwise-folding bars move toward the central part of said crosswise-folded air bag to fold up said left and right end portions under said first set of lengthwise-folding bars and said two boundary areas, and said clamp means and said first set of lengthwise-folding bars move together to fold up said left and right end portions, respectively, between said two boundary areas and the central part,
     wherein said clamp means respectively comprise: a second set of lengthwise-folding bars; and a third set of lengthwise-folding bars disposed just below said second set of lengthwise-folding bars, and
     wherein said apparatus for folding up an air bag further comprises: a fourth set of lengthwise-folding bars which are arranged inward of said respective clamp means in the horizontal direction, said fourth set of lengthwise-folding bar pressing a vicinity of the central part of said crosswise-folded air bag.

9. A method of folding up an air bag comprising the steps of:

folding up a horizontally-spread air bag in a crosswise manner so as to decrease its crosswise width;

clamping a central part of the crosswise folded air bag;

extending left and right regions adjacent to said clamped central part of said crosswise folded air bag in an outer diagonally-upward direction;

holding said extended left and right regions above the plane of said horizontally-spread air bag;

folding up left and right end portions of said crosswise folded air bag into multiple folds in an outer diagonally-downward position relative to said left and right regions so that the folded left and right end portions are outside of said extended left and right regions; and moving the folded left and right end portions, respectively, horizontally inwardly toward the center of said air bag together with said left and right regions while keeping said folded left and right end portions respectively outside of said left and right regions so that the folded left and right end portions are outside of said left and right regions.

\* \* \* \* \*